J. A. SMITH.
SPRING CASTER.
APPLICATION FILED DEC. 2, 1913.
1,099,075.
Patented June 2, 1914.
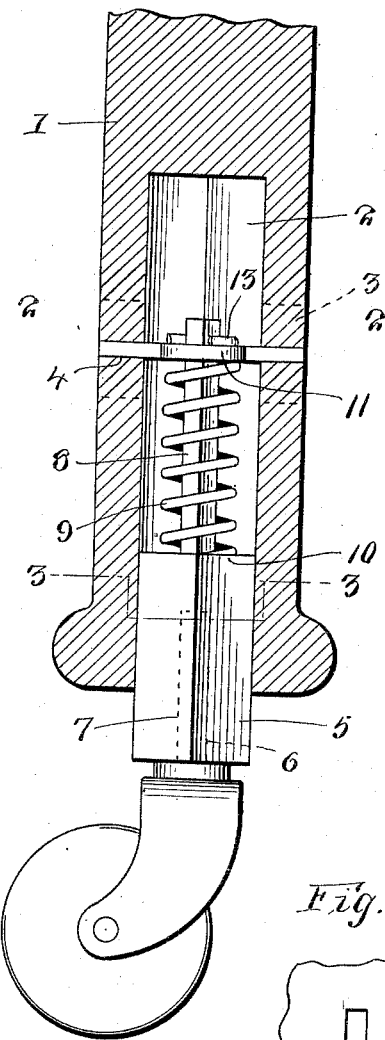
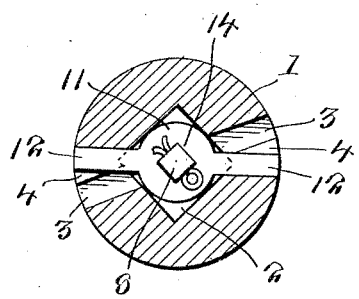
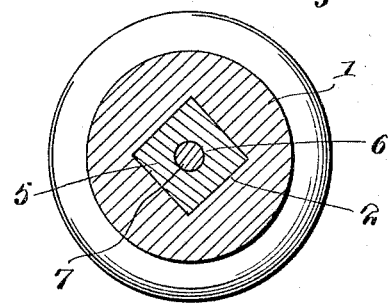
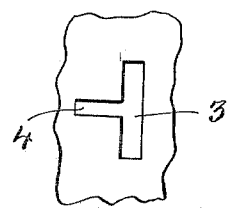
Inventor
James Arthur Smith
By Victor J. Evans
Attorney
Witnesses

UNITED STATES PATENT OFFICE.

JAMES A. SMITH, OF DUNDEE, TEXAS.

SPRING-CASTER.

1,099,075.  Specification of Letters Patent.  Patented June 2, 1914.

Application filed December 2, 1913. Serial No. 804,330.

*To all whom it may concern:*

Be it known that I, JAMES ARTHUR SMITH, a citizen of the United States, residing at Dundee, in the county of Archer and State of Texas, have invented new and useful Improvements in Spring-Casters, of which the following is a specification.

This invention relates to spring casters and the principal object of the invention is to construct a caster in such manner that an adequate resilient support will be obtained for the bed without the use of a spring mattress or like device.

Further objects of the invention will appear as the following description is read in connection with the accompanying drawing, which forms a part of this application, and in which—

Figure 1 is a vertical sectional view through one of the legs of the bed. Fig. 2 is a horizontal section taken on the line 2—2 of Fig. 1. Fig. 3 is a sectional view on the line 3—3 of Fig. 1. Fig. 4 is a detail perspective view of the assembled parts removed from the bed leg. Fig. 5 is a detail side elevation of the leg showing the slots.

Referring more particularly to the drawing, 1 represents an ordinary bed leg having a longitudinally extending socket 2 formed therein which is rectangular in cross section. The leg is also provided with a pair of oppositely arranged longitudinal slots 3 which lead into the socket 2 and which have lateral extensions 4 for a purpose to be hereinafter described.

Slidably mounted within the main leg 1 is an auxiliary or extension leg 5 squared to closely fit the socket 2 and being provided with a longitudinal socket or holder 6 to receive the caster pintle 7. Projecting vertically from the extension leg in line therewith is a square stem 8 which is surrounded by a spiral spring 9 abutting the shoulder 10 at one end and a removable plate 11 at the opposite end. This plate is provided with oppositely extending ears 12 which are adapted to project into the lateral offsets 4 of the slots 3. Once the plate is in position upon the stem 8 it is held against displacement by a cotter key 13, as will be readily understood.

In assembling the parts within the bed leg 1, the plate 11 is first inserted in the leg through one of the slots 3 and then turned into horizontal position. It is then rotated so as to bring the ears 12 within the lateral extensions 4 of the slots 3. In this position the squared central aperture 14 in the plate is arranged to permit the passage of the squared stem 8. By forcing the extension leg 5 into the recess 2 the stem is pushed through the aperture 14 a sufficient distance to insert the pin 13 which prevents disengagement of the parts. It will be noticed that as the extension leg cannot rotate within the leg 2 and the plate cannot rotate upon the stem 8 that the ears 12 will be prevented from disengagement with the extensions 4 of the slots 3 and the parts will all be held in operative position until the pin 13 is first removed. The shank 8 will then be withdrawn and the plate 11 removed if desired.

It will, of course, be understood that this arrangement of parts may be adopted for other articles of furniture without departing from the spirit or scope of the invention.

What is claimed is:—

1. The combination with a supporting member having a socket therein, a caster carrying an extension fitting said socket, said extension being slidably mounted in the socket and having an integral squared and reduced stem, a spring surrounding the stem, an abutment on the extension for engaging the spring, an apertured abutment for the opposite end of the spring through which the stem slides and means for preventing rotation of the last-named abutment.

2. The combination with a supporting member having a socket therein and vertical slots with lateral extensions, of a squared extension support slidably mounted in the socket and fitting the same, a squared and reduced stem on the extension, a spring surrounding the stem and abutting the extension at one end, a disk having a squared aperture, said disk seated in the socket and being provided with ears to fit the lateral extensions of the slots, said stem adapted to pass through the disk and to form an abutment for the opposite end of the spring and a pin passing through the stem for locking the same against displacement in the disk.

In testimony whereof I affix my signature in presence of two witnesses.

JAMES A. SMITH.

Witnesses:
R. A. BELLOH,
M. A. SMITH.